US012352430B1

(12) United States Patent
Wu

(10) Patent No.: US 12,352,430 B1
(45) Date of Patent: Jul. 8, 2025

(54) MANUFACTURING METHOD OF ANTI-GLARE LIGHT STRIP

(71) Applicant: SHENZHEN SHINESKY OPTOELECTRONICS CO., LTD., Guangdong (CN)

(72) Inventor: Bin Wu, Guangdong (CN)

(73) Assignee: SHENZHEN SHINESKY OPTOELECTRONICS CO., LTD., Shenzhen (CN)

( * ) Notice: Subject to any disclaimer, the term of this patent is extended or adjusted under 35 U.S.C. 154(b) by 0 days.

(21) Appl. No.: 18/964,795

(22) Filed: Dec. 2, 2024

(51) Int. Cl.
*F21V 9/40* (2018.01)
*F21V 19/00* (2006.01)
*F21V 23/00* (2015.01)
*F21Y 103/10* (2016.01)
*F21Y 115/10* (2016.01)

(52) U.S. Cl.
CPC ............ *F21V 9/40* (2018.02); *F21V 19/0045* (2013.01); *F21V 23/002* (2013.01); *F21Y 2103/10* (2016.08); *F21Y 2115/10* (2016.08)

(58) Field of Classification Search
CPC ....... F21V 9/40–45; F21V 19/00–0045; F21V 23/00–006; F21Y 2103/10; F21Y 2115/10
See application file for complete search history.

(56) References Cited

U.S. PATENT DOCUMENTS 12,123,585 B1 * 10/2024 Wu ....................... B29C 48/022

* cited by examiner

*Primary Examiner* — Jason M Han
(74) *Attorney, Agent, or Firm* — Daniel M. Cohn

(57) ABSTRACT

A manufacturing method of an anti-glare light strip is provided. The anti-glare light strip includes a light body. The light body includes a light diffusion layer, light shielding layers respectively arranged on two sides of the light diffusion layer, light body shells respectively arranged on outer sides of the light shielding layers, and an anti-glare sheet. A top portion of the light diffusion layer and top ends of the light shielding layers jointly define a mounting groove. A one-time co-extrusion process, two times of co-extrusion processes, or a co-extrusion process and a sleeve process are adopted to manufacture the anti-glare light strip. After processing, the light-transmitting layer has good sealing and high surface flatness. There is no holes on a surface of the anti-glare light strip and there is no dust accumulation, thus avoiding affecting a luminous effect.

17 Claims, 5 Drawing Sheets

MANUFACTURING METHOD OF ANTI-GLARE LIGHT STRIP

TECHNICAL FIELD

The present disclosure relates to a technical field of light strips, and in particular to a manufacturing method of an anti-glare light strip.

BACKGROUND

Currently, neon light strips are widely used in the market, and most neon light strips are design without considering professional optical performance. However, more and more users pay more attention to comfort of lighting, so it is necessary to design the neon light strips while fully considering the optical performance thereof.

In the prior art, conventional neon light strips generally use ink to screen print a layer of honeycomb coating on a surface thereof or use gel to bond honeycomb anti-glare plates on the surface thereof. A bonding process thereof is complicated and requires manual bonding. In addition, the honeycomb anti-glare plates are only bonded to two sides of a conventional light strip, a bonding area thereof is not large, and a bonding effect is not firm, leading to poor integrity of the conventional light strip. In addition, holes on the honeycomb anti-glare plates may accumulate dust, and the dust is not easy to clean and may block a reflective surface of the conventional light strip. A process of using ink to screen print the layer of honeycomb coating is to screen print a grid on a light body of the conventional light strip. Since the honeycomb coating has no three-dimensional effect and only has an appearance effect, which has no substantial help in reducing unified glare rating (UGR) and is unable to realize an anti-glare effect, resulting in an unsatisfactory effect.

SUMMARY

To achieve the above object, the present disclosure provides an manufacturing method of an anti-glare light strip. The anti-glare light strip is manufactured by only one co-extrusion process. The manufacturing method comprising step:

- conveying an anti-glare sheet and an LED light board into an extruder mold;
- extruding diffusion gel, light blocking color gel, and transparent gel from corresponding extruders and respectively feeding the diffusion gel, the light blocking color gel, and the transparent gel into flow channels defined in the extruder mold to form a light diffusion layer, light shielding layers, and a light-transmitting layer, and
- wrapping the LED light board and the anti-glare sheet by a gel, where the anti-glare sheet is disposed between the light diffusion layer and the light-transmitting layer.

Alternatively, the anti-glare light strip is manufactured by two times of co-extrusion processes. The manufacturing method comprising step:

- conveying an LED light board into a first extruder mold;
- extruding diffusion gel, light blocking color gel, and transparent gel from corresponding extruders and respectively feeding the diffusion gel, the light blocking color gel, and the transparent gel into flow channels defined in the first extruder mold to form a light diffusion layer, light shielding layers, and a light-transmitting layer; integrating the light diffusion layer with the light shielding layers to from an inner core and enabling sidewalls of the light shielding layers being higher than the top portion of the light diffusion layer to define a mounting groove in a top portion of the inner core, where a thickness of the mounting groove is equal to a thickness of the anti-glare sheet, and the mounting groove is configured to accommodate the anti-glare sheet; and
- wrapping the anti-glare sheet and the inner core with a first gel in a second extruder mold to from the light-transmitting layer and the light body shells, enabling the light-transmitting layer being covered on the anti-glare sheet; wherein the light body shells are integrated with the light shielding layers, the light body shell two side walls and a bottom portion of the inner core, so that the anti-glare sheet, the inner core, and the light body shells form an integrated structure.

The anti-glare sheet is accommodated in the mounting groove defined in the top portion of the inner core. Before wrapping the anti-glare sheet and the inner core with the first gel, the anti-glare sheet is aligned with the inner core at an entrance of the second extruder mold and is placed into the second extruder mold together with the inner core for being wrapped by the first gel. Alternatively, before wrapping the anti-glare sheet and the inner core with the first gel, the anti-glare sheet is fixed in the mounting groove of the inner core by a second gel, and the anti-glare sheet, the inner core, and the second gel are placed into the second extruder mold together for being wrapped by the first gel.

Alternatively, the anti-glare light strips can also be manufactured through the co-extrusion process and a sleeve process. The manufacturing method comprising steps:

- extruding diffusion gel, light blocking color gel, and transparent gel from corresponding extruders and respectively feeding the diffusion gel, the light blocking color gel, and the transparent gel into flow channels defined in an extruder mold to form a light diffusion layer, light shielding layers, and a light-transmitting layer; where the light diffusion layer, the light shielding layers, and the light-transmitting layer are integrated as a whole; and
- defining a space configured to accommodate an anti-glare sheet between the light-transmitting layer and the light diffusion layer, defining a light board groove at a bottom portion of the light diffusion layer, inserting the anti-glare sheet into the mounting groove to enable the anti-glare sheet being disposed in a light body, and inserting an LED light board into the light board groove.

Compared with the prior art, in the present disclosure, one co-extrusion process, two times of co-extrusion processes, or the co-extrusion process and the sleeve process are adopted to manufacture the anti-glare light strip. The anti-glare sheet is sealed inside the light body, which solves a problem that an anti-glare sheet of a light strip manufactured by a conventional anti-glare process is easy to fade, fall off, accumulate dust, and affect an anti-glare effect. After processing, the light-transmitting layer has good sealing and high surface flatness. There is no holes on the surface and no dust accumulation, thus avoiding affecting a luminous effect. The anti-glare sheet with the grid-shaped through holes blocks light emitted by LED lamp beads from scattering to surroundings, thereby obtaining a lower UGR value, achieving the anti-glare effect, and meeting user needs.

Figure 1:
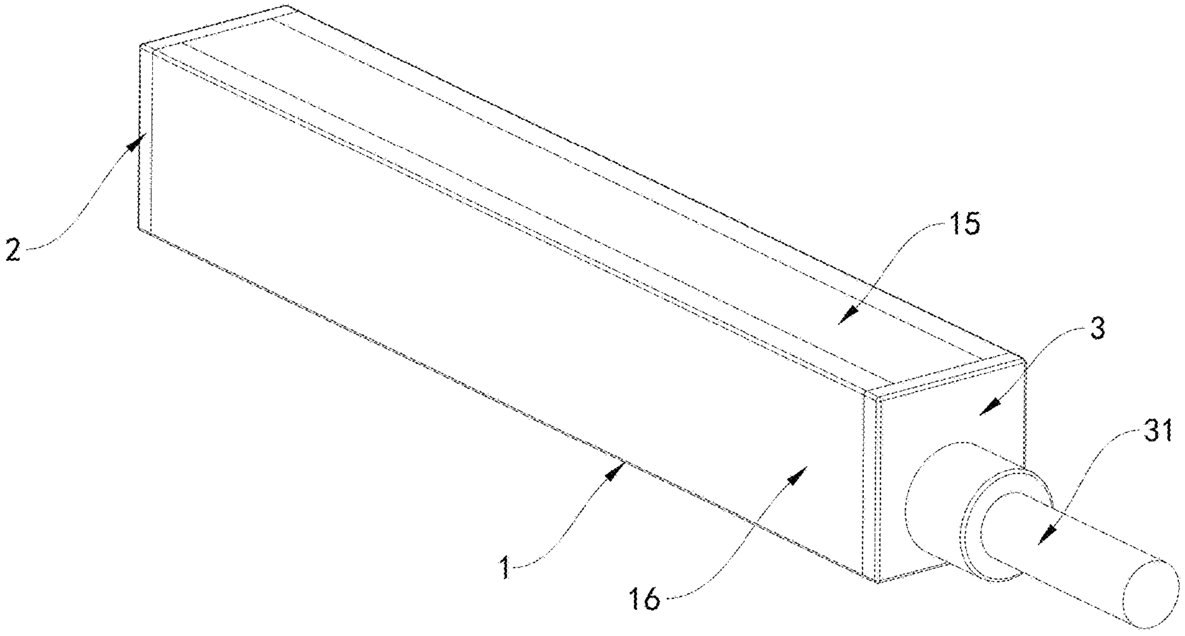
FIG. 1 is a schematic diagram of an anti-glare light strip according to one embodiment of the present disclosure.

In the drawings: 1—light body; 11—inner core; 12—light shielding layer; 13—light diffusion layer; 131—light board groove; 14—mounting groove; 15—light-transmitting layer; 16—light body shell; 17—LED light board; 171—LED lamp bead; 18—anti-glare sheet; 181—through hole; 2—first end cover; 3—second end cover, 31—wire.

DETAILED DESCRIPTION

Technical solutions in the embodiments of the present disclosure will be clearly and completely described below in conjunction with the accompanying drawings in the embodiments of the present disclosure. Obviously, the described embodiments are only a part of the embodiments of the present disclosure, rather than all of the embodiments. Based on the embodiments of the present disclosure, all other embodiments obtained by those of ordinary skill in the art without creative work shall fall within the protection scope of the present disclosure.

Embodiment 1

Figure 2:
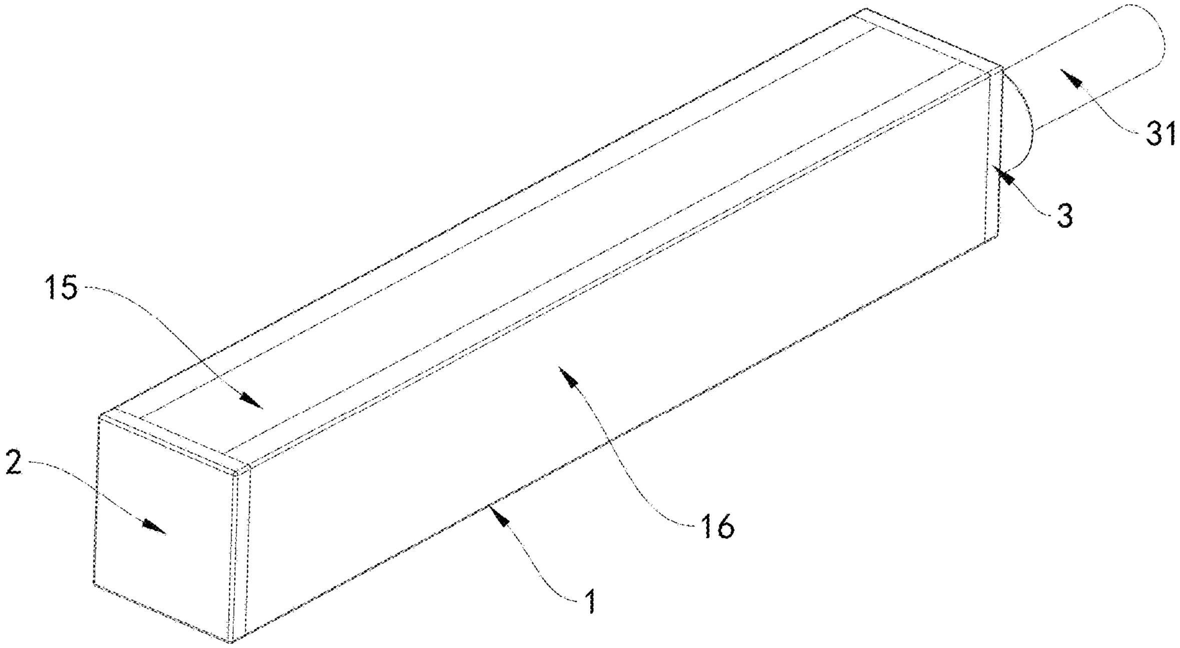
FIG. 2 is another schematic diagram of the anti-glare light strip according to one embodiment of the present disclosure.
Figure 3:
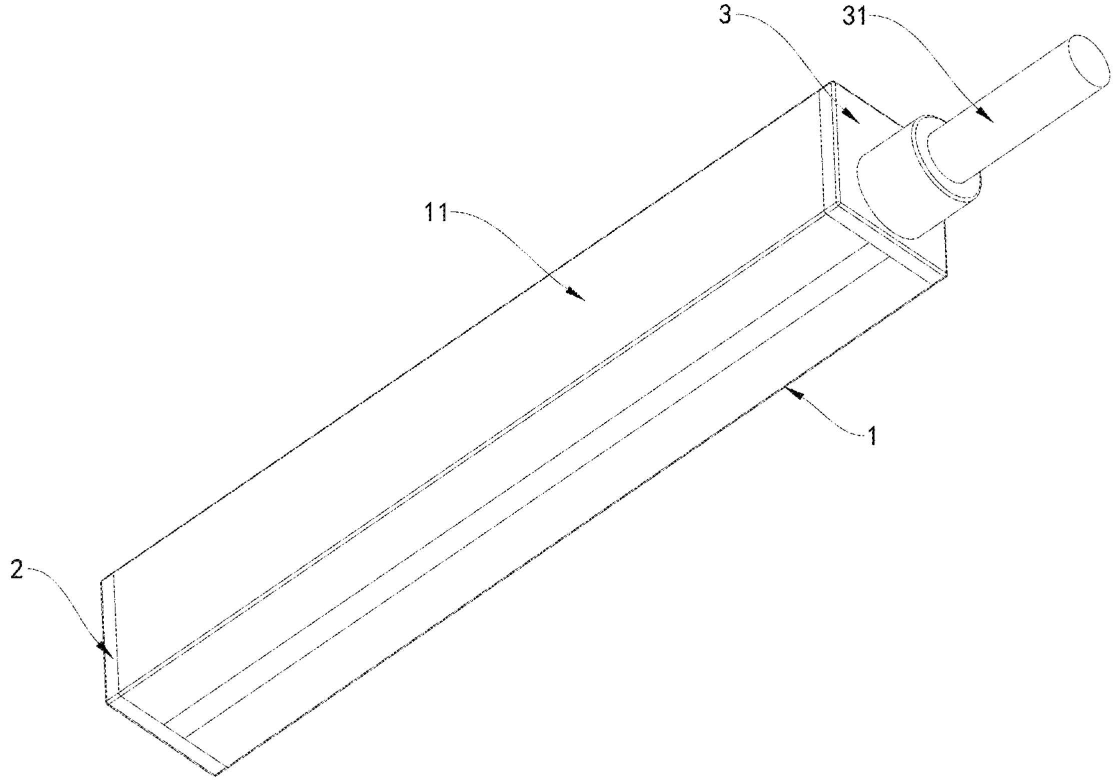
FIG. 3 is another schematic diagram of the anti-glare light strip according to one embodiment of the present disclosure.
Figure 4:
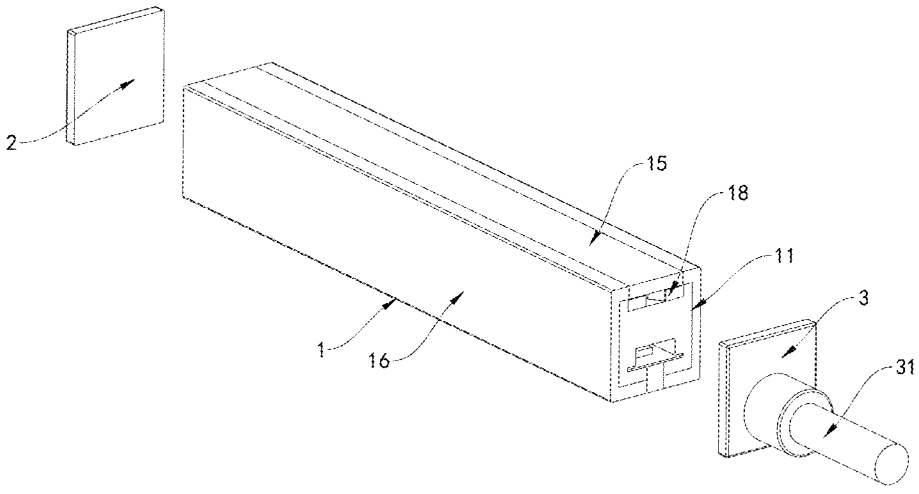
FIG. 4 is a schematic diagram of a first end cover and a second end cover according to one embodiment of the present disclosure.
Figure 5:
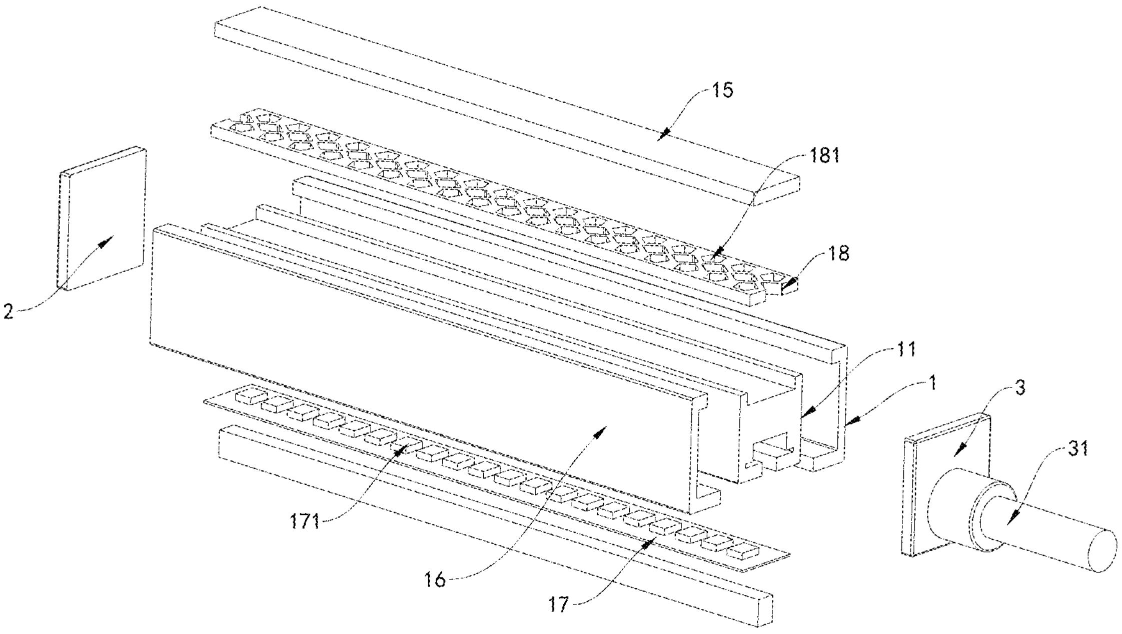
FIG. 5 is an exploded schematic diagram of the anti-glare light strip according to one embodiment of the present disclosure.
Figure 6:
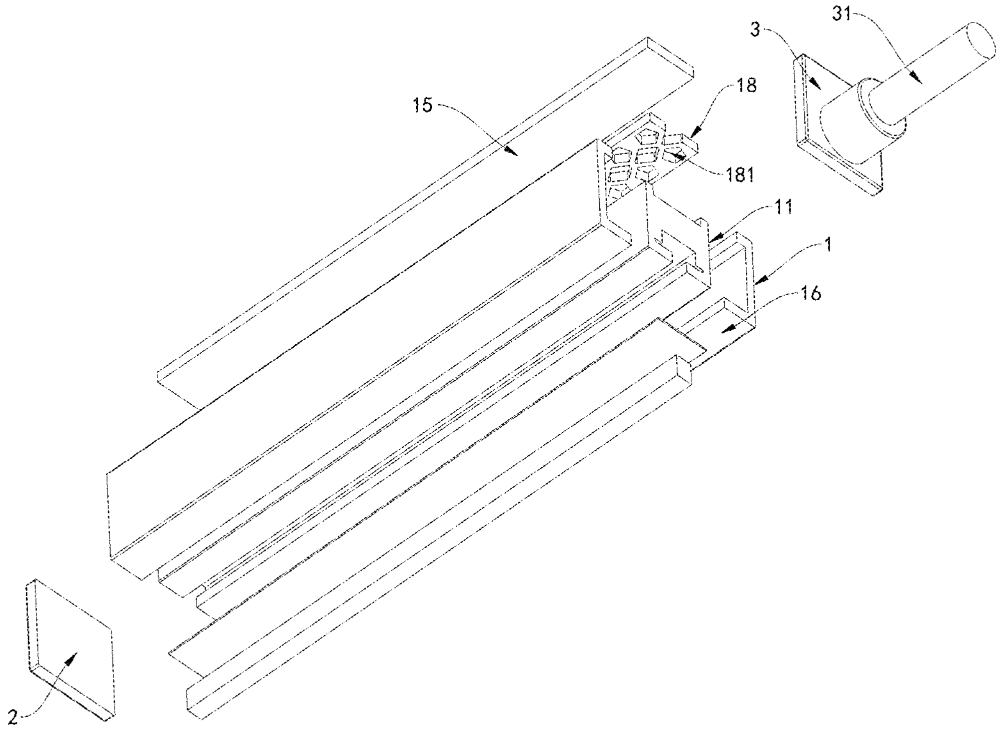
FIG. 6 is another exploded schematic diagram of the anti-glare light strip according to one embodiment of the present disclosure.
Figure 7:
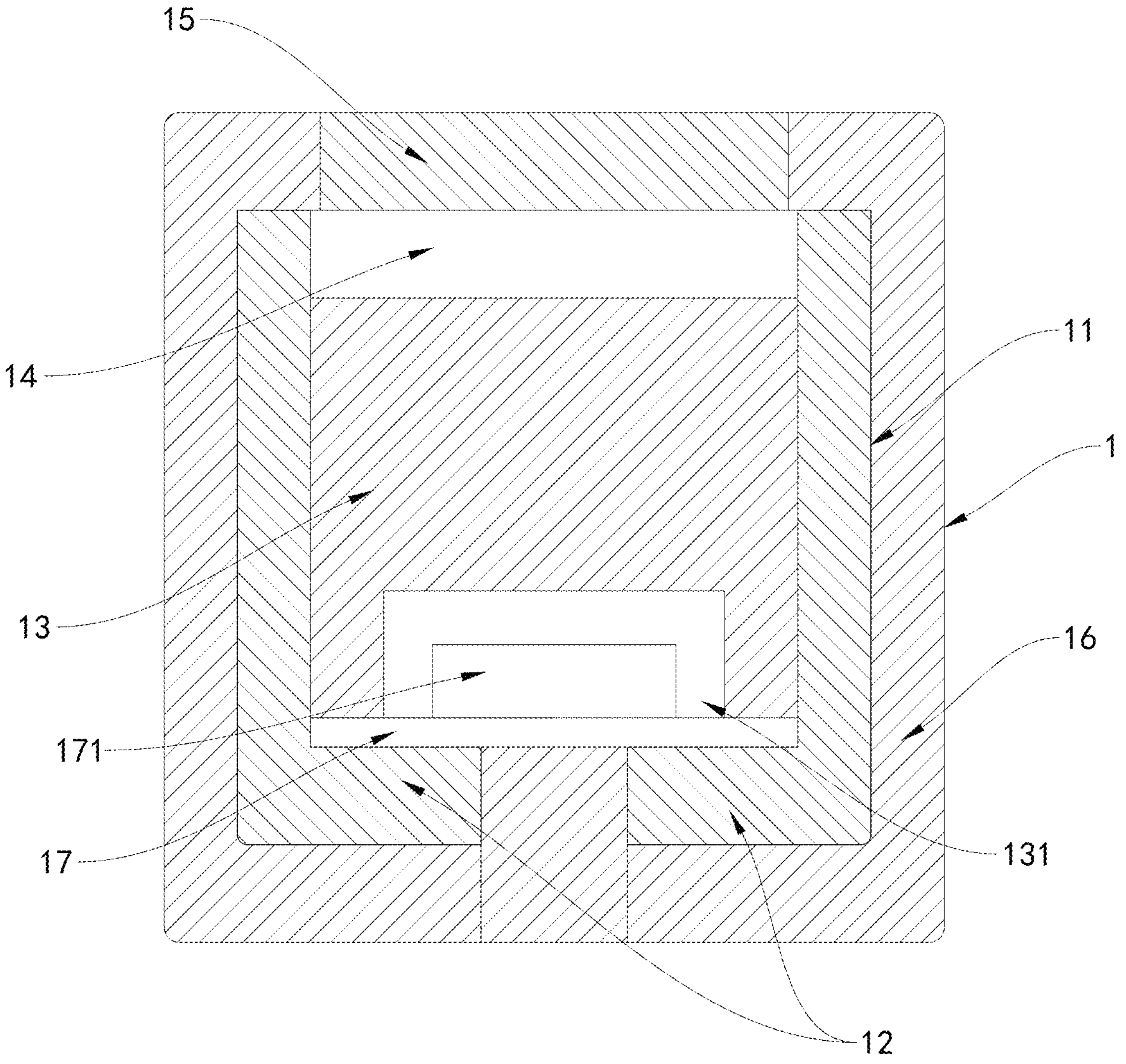
FIG. 7 is a cross-sectional schematic diagram of the anti-glare light strip according to one embodiment of the present disclosure.
Figure 8:
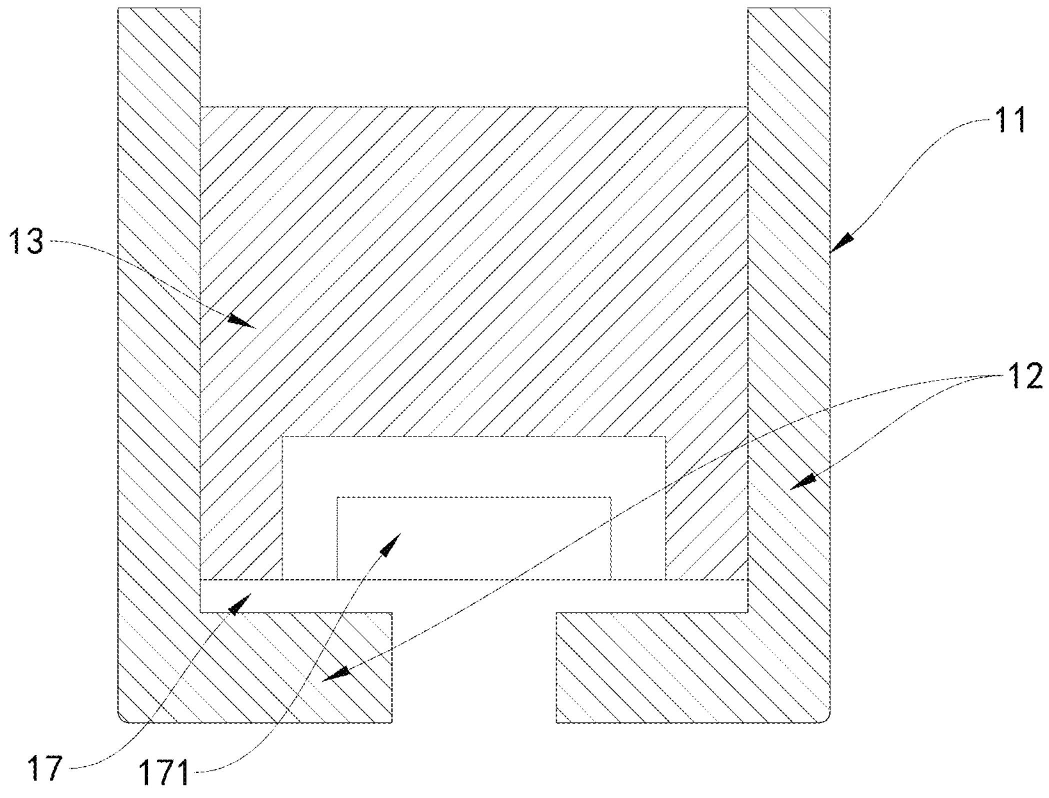
FIG. 8 is a cross-sectional schematic diagram of an inner core of the anti-glare light strip according to one embodiment of the present disclosure.

As shown in FIGS. 1-8, the present disclosure provides an manufacturing method of an anti-glare light strip. The anti-glare light strip comprises a light body 1, the light body 1 comprises a light diffusion layer 13, light shielding layers 12 respectively arranged on two sides of the light diffusion layer 13, light body shells 16 respectively arranged on outer sides of the light shielding layers 12, and an anti-glare sheet 18. A top portion of the light diffusion layer and top ends of the light shielding layers 12 jointly define a mounting groove 14. The anti-glare sheet 18 is mounted in the mounting groove 14. An LED light board 17 is arranged on a bottom portion of the light diffusion layer 13. Grid-shaped through holes 181 are formed in the anti-glare sheet 18. A light-transmitting layer 15 is arranged on a top portion of the anti-glare sheet 18 and is embedded between top portions of the light body shells 16. The manufacturing method comprising step:

- conveying the anti-glare sheet 18 and the LED light board 17 into an extruder mold;
- extruding diffusion gel, light blocking color gel, and transparent gel from corresponding extruders and respectively feeding the diffusion gel, the light blocking color gel, and the transparent gel into flow channels defined in the extruder mold to form the light diffusion layer 13, the light shielding layers 12, and the light-transmitting layer 15; and
- wrapping the LED light board 17 and the anti-glare sheet 18 by a gel.

The anti-glare sheet 18 is disposed between the light diffusion layer 13 and the light-transmitting layer 15.

The anti-glare light strip is manufactured by only one co-extrusion process. Specifically, the diffusion gel, light blocking color gel, and transparent gel are silica gel. After the anti-glare sheet 18 and the LED light board 17 are put into the extruder mold together, the extruder respectively extrude the diffusion gel, the light blocking color gel, and the transparent gel into the extruder mold at the same time. After the diffusion gel, the light blocking color gel, and the transparent gel are solidified, the anti-glare light strip is formed in the extruder mold at one time. That is, the anti-glare light strip is manufactured by a one-time co-extrusion process.

Embodiment 2

As shown in FIGS. 1-8, the present disclosure provides an manufacturing method of an anti-glare light strip. The anti-glare light strip comprises a light body 1. The light body 1 comprises an inner core 11 and light body shells 16 arranged on an outer side of the inner core 11. The inner core 11 comprises a light diffusion layer 13 and light shielding layers 12 respectively arranged on two sides of the light diffusion layer 13. A mounting groove 14 is formed between a top portion of the light diffusion layer 13 and top ends of the light shielding layers 12. An anti-glare sheet 18 is mounted in the mounting groove 14. An LED light board 17 is arranged on a bottom portion of the inner core 11. The anti-glare sheet 18 having grid-shaped through holes 181 is arranged at a top portion of the inner core 11. A light-transmitting layer 15 is arranged on a top portion of the anti-glare sheet 18 and is embedded in top portions of the light body shells 16. The manufacturing method comprising steps:

- conveying the LED light board 17 into a first extruder mold;
- extruding diffusion gel, light blocking color gel, and transparent gel from corresponding extruders and respectively feeding the diffusion gel, the light blocking color gel, and the transparent gel into flow channels defined in the first extruder mold to form the light diffusion layer 13, the light shielding layers 12, and the light-transmitting layer 15; integrating the light diffusion layer 13 with the light shielding layers 12 to from the inner core 11 and enabling sidewalls of the light shielding layers 12 being higher than the top portion of the light diffusion layer 13 to define the mounting groove 14 in the top portion of the inner core 11, where a thickness of the mounting groove 14 is equal to a thickness of the anti-glare sheet 18, and the mounting groove 14 is configured to accommodate the anti-glare sheet 18; and
- wrapping the anti-glare sheet 18 and the inner core 11 with a first gel in a second extruder mold to from the light-transmitting layer and the light body shells 16, enabling the light-transmitting layer being covered on the anti-glare sheet 18.

The light body shells 16 are integrated with the light shielding layers, the light body shell 16 two side walls and a bottom portion of the inner core 11, so that the anti-glare sheet 18, the inner core 11, and the light body shells 16 form an integrated structure.

The anti-glare sheet 18 is accommodated in the mounting groove 14 defined in the top portion of the inner core 11, Before wrapping the anti-glare sheet 18 and the inner core 11 with the first gel, the anti-glare sheet 18 is aligned with the inner core 11 at an entrance of the second extruder mold and is placed into the second extruder mold together with the inner core 11 for being wrapped by the first gel. Alternatively, before wrapping the anti-glare sheet 18 and the inner core 11 with the first gel, the anti-glare sheet 18 is fixed in the mounting groove of the inner core 11 by a second gel, and the anti-glare sheet 18, the inner core 11, and the second gel are placed into the second extruder mold together for being wrapped by the first gel.

In the embodiment, the first gel and the second gel are the silica gel. The anti-glare light strip is manufactured by two times of the co-extrusion processes. In a first co-extrusion process, the LED light board and different silica gels are fed into the first extruder mold together to form the inner core defining the mounting groove on the top portion thereof. In a second co-extrusion process, the inner core and the anti-glare sheet are simultaneously fed into the second extruder mold, and the the inner core and the anti-glare sheet are wrapped with the silica gel. After the silica gel is solidified, the anti-glare light strip is obtained in the second extruder mold. It should be noted that in the embodiment, the first extruder mold is different from the extruder mold. Of course, in other embodiments, only one extruder mold may be used to form the inner core and the anti-glare light strip in batches.

Embodiment 3

As shown in FIGS. 1-8, the present disclosure provides a manufacturing method of an anti-glare light strip. The anti-glare light strip comprises a light body 1. The light body 1 comprises an inner core 11 and light body shells 16 arranged on an outer side of the inner core 11. The inner core 11 comprises a light diffusion layer 13 and light shielding layers 12 respectively arranged on two sides of the light diffusion layer 13. A mounting groove is formed between a top portion of the light diffusion layer 13 and top ends of the light shielding layers 12. The anti-glare sheet 18 is mounted in the mounting groove. An LED light board 17 is arranged on a bottom portion of the inner core 11. An anti-glare sheet 18 having grid-shaped through holes 181 is arranged at a top portion of the inner core 11. A light-transmitting layer is arranged on a top portion of the anti-glare sheet 18 and is embedded in the top portions of the light body shells 16. The manufacturing method comprising steps:

extruding diffusion gel, light blocking color gel, and transparent gel from corresponding extruders and respectively feeding the diffusion gel, the light blocking color gel, and the transparent gel into flow channels defined in an extruder mold to form the light diffusion layer 13, the light shielding layers 12, and the light-transmitting layer; wherein the light diffusion layer 13, the light shielding layers 12, and the light-transmitting layer are integrated as a whole (that is, a co-extrusion process); and defining a space configured to accommodate the anti-glare sheet 18 between the light-transmitting layer and the light diffusion layer, defining a light board groove at a bottom portion of the light diffusion layer, inserting the anti-glare sheet 18 into the mounting groove to enable the anti-glare sheet 18 being disposed in the light body 1, and inserting the LED light board into the light board groove.

By such design, the LED light board 17 and the anti-glare sheet 18 are sleeved in the light body 1 to facilitate later assembly.

The anti-glare light strip of the embodiment is manufactured by one co-extrusion process and a sleeve process. In the co-extrusion process, only the anti-glare sheet is placed into the extruder mold, and different silica gels are fed into the extruder mold through respective extruders. Different silica gels wrap the anti-glare sheet and are solidified, so as to mold a silicone light body without the LED light board in the extruder mold. The silicone light body defines the light board groove. In the sleeve process, the LED light board is inserted into the silicone lamp body to enable the LED light board being sleeved in the silicone light body. Thus, the anti-glare light strip is manufactured.

Specifically, the light-transmitting layer 15 is disposed above the anti-glare sheet 18 and completely covers the anti-glare sheet 18. Light emitted by the LED lamp beads 171 penetrates the light diffusion layer 13 and the anti-glare sheet 18 and is transmitted through the light-transmitting layer 15. The light-transmitting layer 15 presses the anti-glare sheet 18 tightly against the light diffusion layer 13 and is co-extruded with two sides of the light body shells 16 as a whole. The light-transmitting layer 15 is flat without holes that cause dust accumulation, so a light-emitting effect is not affected and the anti-glare light strip is more convenient to use. The LED light board 17 is a light source component of the anti-glare light strip. The LED light board 17 is a flexible circuit board with various package types of the LED lamp beads 171 mounted thereon, which determines a color temperature and a color of the light emitted by the anti-glare light strip.

Specifically, the top ends of the light shielding layers 12 are higher than a top portion of the light diffusion layer 13, a light board groove 131 is defined in the bottom portion of the light diffusion layer 13, and the LED light board 17 is arranged in the light board groove 131. The light emitted by the LED lamp beads 171 on a top portion of the LED light board 17 is transmitted through the light diffusion layer 13, which has an effect of light uniformity and diffusion.

Specifically, the bottom end of each of the light shielding layer extends to a bottom portion of the LED light board 17 to shield light emit from two sides and the bottom portion of the LED light board 17.

Specifically, LED lamp beads 171 are arranged on the top portion of the LED light board 17. The LED light board 17 is flexible, the anti-glare sheet 18 is flexible, the light diffusion layer 13 is a transparent flexible body or a foggy flexible body, and the light emitted by the LED lamp beads 171 on the top portion of the LED light board 17 passes through the light diffusion layer 13. The light diffusion layer 13 is the transparent flexible body or the foggy flexible body, and the light diffusion layer 13 may be made of silicone. The LED lamp beads 171 are evenly spaced on the top portion of the LED light board 17, making a light distribution more uniform.

Specifically, the anti-glare sheet 18 comprises the grid-shaped through holes 181, that is, the grid-shaped through holes form a grid. The anti-glare sheet 18 is a grid sheet-like flexible body with a certain thickness. The anti-glare sheet 18 is placed in the mounting groove 14 disposed above the light diffusion layer 13. The grid-shaped through holes 181 of the anti-glare sheet 18 have a light-transmitting effect. The light emitted by the LED lamp beads 171 is blocked by a grid frame of the anti-glare sheet 18 that has a certain thickness, so the light is not scattered to a surrounding area, thereby obtaining a lower UGR value and achieving the anti-glare effect. The anti-glare sheet 18 is located between the light-transmitting layer 15 and the light diffusion layer 13, and the anti-glare sheet 18 is built in the light body 1, which also solves defects of a conventional anti-glare process of light strips that are easy to fade, fall off, accumulate dust, and affect the anti-glare effect.

Specifically, the mounting groove is U-shaped or square-shaped. The light board groove is inverted T-shaped.

The mounting groove 14 that is U-shaped is defined by the light diffusion layer 13 and the light shielding layers 12, and the mounting groove 14 that is square-shaped is defined by the light diffusion layer 13, the light shielding layers 12 and the light-transmitting layer 15.

Specifically, the anti-glare light strip further comprises a first end cover 2 and a second end cover 3. The first end cover 2 and the second end cover 3 are respectively arranged at two ends of the light body shells 16. A wire 31 is built in the second end cover 3. One end of the wire 31 is electrically connected to the LED light board.

The first end cover 2 and the second end cover 3 are configured to seal two ends of the light body shells 16. The wire 31 passes through an interior of the second end cover 3 and is electrically connected to the LED light board 17. The wire 31 is not limited to passing through the interior of the second end cover 3. According to a mounting environment, the wire 31 may pass through an interior of the first end cover 2.

Specifically, the anti-glare sheet 18 is formed by continuous compression molding technology. After a certain length of the anti-glare sheet 18 is formed, the anti-glare sheet 18 is controlled by an automatic device to step forward to be moved out of a mold. After a tail end of the anti-glare sheet 18 is accurately positioned with a positioning groove of the mold, the tail end of the anti-glare sheet 18 is connected to a head of a next anti-glare sheet 18 and the process is repeated to form a roll of the anti-glare sheets 18. Alternatively, after a plurality of anti-glare sheets 18 are molded, the plurality of anti-glare sheets 18 are geld end to end to form the roll of the anti-glare sheets 18. Alternatively, after the plurality of anti-glare sheets 18 are molded, each two adjacent anti-glare sheets 18 are molded together to form the roll of the anti-glare sheets 18.

In summary, in the present disclosure, one co-extrusion process, two times of co-extrusion processes, or the co-extrusion process and the sleeve process are adopted to manufacture the anti-glare light strip. The anti-glare sheet 18 is sealed inside the light body 1, which solves a problem that an anti-glare sheet of a light strip manufactured by a conventional anti-glare process is easy to fade, fall off, accumulate dust, and affect an anti-glare effect. After processing, the light-transmitting layer has good sealing and high surface flatness. There is no holes on the surface and no dust accumulation, thus avoiding affecting a luminous effect. The anti-glare sheet with the grid-shaped through holes blocks light emitted by LED lamp beads from scattering to surroundings, thereby obtaining a lower UGR value, achieving the anti-glare effect, and meeting user needs.

It should be noted that, in the present disclosure, relational terms, such as "first" and "second", are only used to distinguish one feature or operation from another feature or operation, and do not necessarily require or imply any actual relationship or sequence exists between these features or operations. Moreover, terms "comprise", "include" or any other variation thereof are intended to encompass non-exclusive inclusion, such that a process, method, article or device not only comprises elements explicitly listed, but also comprises elements not explicitly listed or other elements inherent to such a process, method, article or device.

What is claimed is:

1. A manufacturing method of an anti-glare light strip, wherein the anti-glare light strip comprises a light body, the light body comprises a light diffusion layer, light shielding layers respectively arranged on two sides of the light diffusion layer, light body shells respectively arranged on outer sides of the light shielding layers, and an anti-glare sheet, wherein a top portion of the light diffusion layer and top ends of the light shielding layers jointly define a mounting groove, the anti-glare sheet is mounted in the mounting groove, an LED light board is arranged on a bottom portion of the light diffusion layer, grid-shaped through holes are formed in the anti-glare sheet, and a light-transmitting layer is arranged on a top portion of the anti-glare sheet and is embedded between top portions of the light body shells; wherein the manufacturing method comprising step:

conveying the anti-glare sheet and the LED light board into an extruder mold;

extruding diffusion gel, light blocking color gel, and transparent gel from corresponding extruders and respectively feeding the diffusion gel, the light blocking color gel, and the transparent gel into flow channels defined in the extruder mold to form the light diffusion layer, the light shielding layers, and the light-transmitting layer, and wrapping the LED light board and the anti-glare sheet by a gel, wherein the anti-glare sheet is disposed between the light diffusion layer and the light-transmitting layer.

2. The manufacturing method according to claim 1, wherein top ends of the light shielding layers are higher than a top portion of the light diffusion layer, a light board groove is defined in the bottom portion of the light diffusion layer, and the LED light board is arranged in the light board groove.

3. The manufacturing method according to claim 2, wherein the bottom end of each of the light shielding layer extends to a bottom portion of the LED light board to shield light emit from two sides and the bottom portion of the LED light board.

4. The manufacturing method according to claim 1, wherein the mounting groove is U-shaped or square-shaped.

5. The manufacturing method according to claim 1, wherein the light board groove is inverted T-shaped.

6. The manufacturing method according to claim 1, wherein the anti-glare light strip further comprises a first end cover and a second end cover, the first end cover and the second end cover are respectively arranged at two ends of the light body shells, a wire is built in the second end cover, and one end of the wire is electrically connected to the LED light board.

7. A manufacturing method of an anti-glare light strip, wherein the anti-glare light strip comprises a light body, the light body comprises an inner core and light body shells arranged on an outer side of the inner core, the inner core comprises a light diffusion layer and light shielding layers respectively arranged on two sides of the light diffusion layer, a mounting groove is formed between a top portion of the light diffusion layer and top ends of the light shielding layers, an anti-glare sheet is mounted in the mounting groove, an LED light board is arranged on a bottom portion of the inner core, the anti-glare sheet having grid-shaped through holes is arranged at a top portion of the inner core, and a light-transmitting layer is arranged on a top portion of the anti-glare sheet and is embedded in top portions of the light body shells, wherein the manufacturing method comprising steps:

conveying the LED light board into a first extruder mold;

extruding diffusion gel, light blocking color gel, and transparent gel from corresponding extruders and respectively feeding the diffusion gel, the light blocking color gel, and the transparent gel into flow channels defined in the first extruder mold to form the light diffusion layer, the light shielding layers, and the light-transmitting layer; integrating the light diffusion layer with the light shielding layers to from the inner core and enabling sidewalls of the light shielding layers being higher than the top portion of the light diffusion layer to define the mounting groove in the top portion of the inner core, wherein a thickness of the mounting groove is equal to a thickness of the anti-glare sheet, and the mounting groove is configured to accommodate the anti-glare sheet; and wrapping the anti-glare sheet and the inner core with a first gel in a second extruder mold to from the light-transmitting layer and the light body shells, enabling the light-transmitting layer being covered on the anti-glare sheet; wherein the light body shells are integrated with the light shielding layers, the light body shell two side walls and a bottom portion of the inner core, so that the anti-glare sheet, the inner core, and the light body shells form an integrated structure;

wherein the anti-glare sheet is accommodated in the mounting groove defined in the top portion of the inner core, wherein before wrapping the anti-glare sheet and the inner core with the first gel, the anti-glare sheet is aligned with the inner core at an entrance of the second extruder mold and is placed into the second extruder mold together with the inner core for being wrapped by the first gel; or before wrapping the anti-glare sheet and the inner core with the first gel, the anti-glare sheet is fixed in the mounting groove of the inner core by a second gel, and the anti-glare sheet, the inner core, and the second gel are placed into the second extruder mold together for being wrapped by the first gel.

8. The manufacturing method according to claim 7, wherein a light board groove is defined in a bottom portion of the light diffusion layer, and the LED light board is arranged in the light board groove.

9. The manufacturing method according to claim 8, wherein the bottom end of each of the light shielding layer extends to a bottom portion of the LED light board to shield light emit from two sides and the bottom portion of the LED light board.

10. The manufacturing method according to claim 7, wherein the mounting groove is U-shaped or square-shaped.

11. The manufacturing method according to claim 8, wherein the light board groove is inverted T-shaped.

12. The manufacturing method according to claim 7, wherein the anti-glare light strip further comprises a first end cover and a second end cover, the first end cover and the second end cover are respectively arranged at two ends of the light body shells, a wire is built in the second end cover, and one end of the wire is electrically connected to the LED light board.

13. A manufacturing method of an anti-glare light strip, wherein the anti-glare light strip comprises a light body, wherein the light body comprises an inner core and light body shells arranged on an outer side of the inner core, the inner core comprises a light diffusion layer and light shielding layers respectively arranged on two sides of the light diffusion layer, a mounting groove is formed between a top portion of the light diffusion layer and top ends of the light shielding layers, the anti-glare sheet is mounted in the mounting groove, an LED light board is arranged on a bottom portion of the inner core, an anti-glare sheet having grid-shaped through holes is arranged at a top portion of the inner core, and a light-transmitting layer is arranged on a top portion of the anti-glare sheet and is embedded in the top portions of the light body shells; wherein the manufacturing method comprising steps:

extruding diffusion gel, light blocking color gel, and transparent gel from corresponding extruders and respectively feeding the diffusion gel, the light blocking color gel, and the transparent gel into flow channels defined in an extruder mold to form the light diffusion layer, the light shielding layers, and the light-transmitting layer; wherein the light diffusion layer, the light shielding layers, and the light-transmitting layer are integrated as a whole; and defining a space configured to accommodate the anti-glare sheet between the light-transmitting layer and the light diffusion layer, defining a light board groove at a bottom portion of the light diffusion layer, inserting the anti-glare sheet into the mounting groove to enable the anti-glare sheet being disposed in the light body, and inserting the LED light board into the light board groove.

14. The manufacturing method according to claim 13, wherein the bottom end of each of the light shielding layer extends to a bottom portion of the LED light board to shield light emit from two sides and the bottom portion of the LED light board.

15. The manufacturing method according to claim 13, wherein the mounting groove is U-shaped or square-shaped.

16. The manufacturing method according to claim 13, wherein the light board groove is inverted T-shaped.

17. The manufacturing method according to claim 13, wherein the anti-glare light strip further comprises a first end cover and a second end cover, the first end cover and the second end cover are respectively arranged at two ends of the light body shells, a wire is built in the second end cover, and one end of the wire is electrically connected to the LED light board.

* * * * *